United States Patent [19]

Budrikis et al.

[11] Patent Number: 4,554,656

[45] Date of Patent: Nov. 19, 1985

[54] METHOD AND SYSTEM FOR CONTROLLING THE INTERCONNECTING OF A PLURALITY OF LOCAL DATA NETWORKS

[75] Inventors: Zigmantas L. Budrikis, Dalkeith, Australia; Arun N. Netravali, Westfield, N.J.

[73] Assignee: AT&T Bell Laboratories, Murray Hill, N.J.

[21] Appl. No.: 407,145

[22] Filed: Aug. 11, 1982

[51] Int. Cl.[4] ............................................. H04J 3/02
[52] U.S. Cl. ................................. 370/85; 340/825.5
[58] Field of Search .......... 455/32; 340/825.5, 825.51, 340/825.07; 370/24, 57, 76, 85, 93, 94, 124

[56] References Cited

U.S. PATENT DOCUMENTS

| | | | |
|---|---|---|---|
| 3,846,587 | 11/1974 | Schenkel et al. | 370/85 |
| 3,851,104 | 10/1974 | Willard et al. | 370/84 |
| 4,063,220 | 12/1977 | Metcalfe et al. | 370/93 |
| 4,281,380 | 7/1981 | DeMesa, III et al. | 340/825.5 |
| 4,332,027 | 5/1982 | Malcolm et al. | 370/85 |
| 4,464,658 | 8/1984 | Thelen | 340/825.5 |
| 4,472,712 | 9/1984 | Ault et al. | 370/85 |

*Primary Examiner*—Douglas W. Olms
*Assistant Examiner*—Kenneth I. Rokoff
*Attorney, Agent, or Firm*—Jack S. Cubert

[57] ABSTRACT

This disclosure relates to the instant method and system for controlling the interconnecting of a plurality of local communications networks. A source station and a destination station may respectively be adapted to be coupled to at least one communications channel of a communications path, which path includes a plurality of channels, each channel being assignable to at least one of a plurality of local data networks. The respective stations are adapted to determine the home network of the other respective stations with which the respective stations may communicate. Broadly, a source station, which has a message to transmit to a destination station, determines the home network of the destination and couples a first source receiver and a source transmitter to the home network of the destination for transmitting a packet from the source to the destination. A first packet may be transmitted when the source station acquires access to an idle channel of the destination home network. Further packets may be transmitted, not on the destination home network, but rather on the source home network. The source transmitter may be decoupled from the destination home network (if already so coupled) and may be coupled to the source home network for such further packet transmission.

22 Claims, 6 Drawing Figures

LEGEND
B: CHANNEL BUSY
C: COLLISION DURING TRANSMISSION
HD: HOME NETWORK OF DESTINATION
HS: HOME NETWORK OF SOURCE
LBT: LISTEN BEFORE TRANSMITTING
LM: IS THIS THE LAST MESSAGE
LP: IS THIS THE LAST PACKET
LWT: LISTEN WHILE TRANSMITTING
SNM: SCHEDULE TRANSMISSION OF NEXT MESSAGE
SNP: SCHEDULE TRANSMISSION OF NEXT PACKET
SRB: SCHEDULE RETRY AFTER BUSY CHANNEL
SRC: SCHEDULE RETRY AFTER COLLISION
SREC1: FIRST SOURCE RECEIVER
SREC2: SECOND SOURCE RECEIVER
STR: SOURCE TRANSMITTER
WIC: WAIT FOR IDLE CHANNEL
WNM: WAIT FOR NEXT MESSAGE
XMIT: TRANSMIT

METHOD AND SYSTEM FOR CONTROLLING THE INTERCONNECTING OF A PLURALITY OF LOCAL DATA NETWORKS

TECHNICAL FIELD

This invention relates to communications systems and, more particularly, to a multiple access digital communications system and method.

BACKGROUND OF THE INVENTION

In the early days of the telephone art, use of the telephone was often confined to communications among users within a local geographic area. As a result and over the years, the economies related to accessing a communications system have lead to telephones in a local area usually being interconnected through a central controller, often called a local central office in the art.

As digital computers came upon the scene, another local community of use was discernible. Hence, a central controller is commonly employed for interconnecting various user terminals, or stations. For example, U.S. Pat. No. 3,851,104; entitled "Digital Communications System" and issued Nov. 26, 1974; discloses a time division, multiple access communications system which, under the control of a central terminal, allows an interconnection among a plurality of user terminals by way of a single communications signal channel.

As the digital computer art advanced, parallel advances in the semiconductor art have lead to smaller, relatively inexpensive computers. With the advent of such smaller computers, the technique of central control is being abandoned in favor of a distributed control technique. Also, because of the usually bursty nature of digital computer information, the recent trend has also been toward communications systems having a capability for handling packets of digital information. One such distributed control communications system is disclosed in U.S. Pat. No. 4,063,220; entitled "Multipoint Data Communication System with Collision Detection" and issued Dec. 13, 1977. Such known systems are commonly called Carrier Sense Multiple Access/Collision Detection (CSMA/CD) Systems. Indeed, the '220 patent discloses a communications system in which, when a terminal (or a station, or a source) is to start an intended packet transmission on a communications channel, a phase decoder listens to signals on the channel before transmitting (LBT). Upon detecting the presence of another transmission on the channel (typically by sensing the presence of a carrier signal), the terminal delays the intended transmission until no other transmissions are sensed, i.e., it waits for an idle channel (WIC) (typically by sensing the absence of a carrier signal). When the intended transmission is started, the terminal thereafter listens to signals on the channel, i.e., it listens while transmitting (LWT). If another transmission (or an interference, or a collision) is detected, the intended transmission is terminated and a random number generator is used to schedule a retry after the collision (SRC) by selecting a random interval of time at the completion of which a retransmission of the packet will be attempted.

Known CSMA/CD systems tend to operate at bit rates in the order of ten megabits-per-second and with path electrical cable lengths not exceeding about 2.5 kilometers. Unfortunately, the efficiency of known CSMA/CD systems tends to decrease either, if for a fixed cable length, the bit rate is increased or, if for a fixed bit rate, the cable length is increased. Hence, the art is in need of alternatives for improving system efficiency.

SUMMARY OF THE INVENTION

This and other needs are mitigated with the instant method and system for controlling the interconnecting of a plurality of local communications networks. A source station and a destination station may respectively be adapted to be coupled to at least one communications channel of a communications path, which path includes a plurality of channels, each channel being assignable to at least one of a plurality of local data networks. The network(s) to which a station is coupled on a regular basis is called the home network of the station. The respective stations are adapted to determine the home network of the other respective stations with which the respective stations may communicate. Broadly, a source station, which has a message to transmit to a destination station, determines the home network of the destination and couples a first source receiver and a source transmitter to the home network of the destination for transmitting a packet from the source to the destination. A first packet may be transmitted when the source station acquires access to an idle channel of the destination home network. Further packets may be transmitted, not on the destination hom network, but rather on the source home network. The source transmitter may be decoupled from the destination home network (if already so coupled) and may be coupled to the source home network for such further packet transmission.

BRIEF DESCRIPTION OF THE DRAWING

The invention should become fully apparent when taken in connection with the following detailed description and accompanying drawing in which.

DETAIL DESCRIPTION

Figure 1:
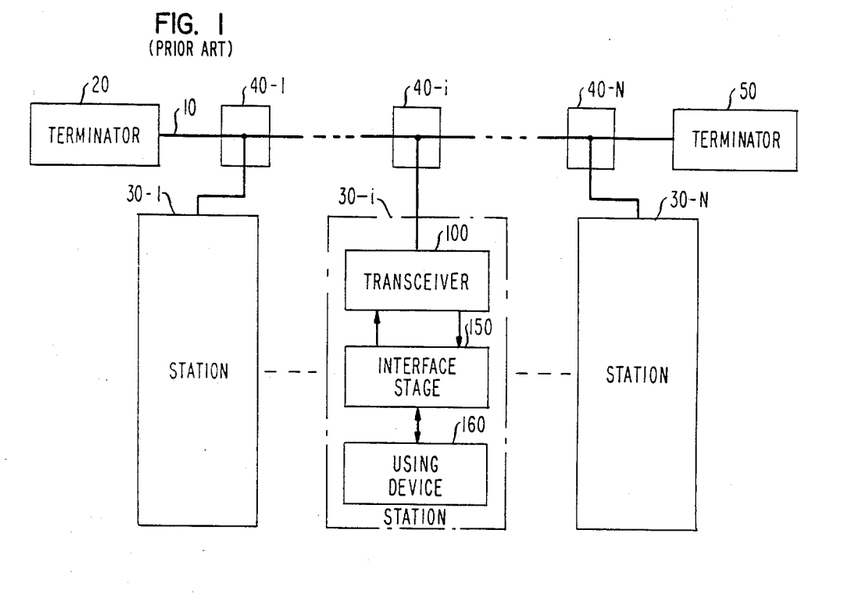
FIG. 1 illustrates a prior art communications system including a plurality of stations (also called terminals, sources or destinations in the art), interconnected by a communications path, which system is useful in describing the principles of the invention.

Referring to the illustrative system structure shown in FIG. 1, which structure broadly parallels the structure disclosed in the aforecited U.S. Pat. No. 4,063,220, the teachings of which are herein incorporated by reference, bidirectional communications signal path 10 is extended between terminators 20 and 50 and through each of a plurality of cascaded transmission couplers such as passive coupler 40-i. Bidirectional path 10 may be embodied, for example, through a conventional high frequency coaxial or fiber optic cable. Each of terminators 20 and 50 may, for example, be a conventional impedance matching device for limiting reflections. Each of couplers 40-1 through 40-N may, for example, be a conventional T-connector which is insertable in path 10 so that signals to and from each respective one of terminals, or stations, 30-1 through 30-N may be coupled to the communications link thereby formed. (Parenthetically, the works "station" and "terminal" are used interchangeably herein while the words "source" and "destination" imply a function of a station.) In particular, on the one hand, coupler 40-i is for electrically coupling signals, representing, for example, packets of information, from communications path 10 to station 30-i. In that manner, station 30-i may read (or receive) packets from communications path 10. On the other hand, coupler 40-i is also for coupling signals representing, for example, packets of information, from station 30-i onto communications path 10. In that manner, station 30-i may write (or transmit) packets on communications path 10.

Station 30-i (or 30-j or 30-k) may include transceiver 100 (or 200 or 300), interface stage 150 (or 250 or 350), and, as a using device, station equipment 160 (or 260 or 360). In turn, the station equipment could include equipment such as a common telephone coupled through analog-to-digital and digital-to-analog converters and functioning as a voice source for providing digitized voice samples and for reconstructing an analog speech waveform, respectively. Alternatively, the station equipment could include a digital computer for providing digital data traffic. Also alternatively the station equipment could include a digital interface unit, for example, for interconnecting path 10 with one or more other such paths, some of the other paths perhaps being geographically or electrically distant from the instant path. Obviously, still other alternatives will occur to the skilled artworker.

As an aside, it is well known that electrical signals, depending upon the electromagnetic transmission characteristics of the transmission medium, typically propagate on a communications path at a speed in the range 0.6 to 0.9 of the speed of light, which is estimated here to be about 186,000 miles per second. For ease of discussion, the estimated speed of light is here translated to an electromagnetic propagation speed of approximately one foot per nanosecond. Accordingly, it should be clear that path 10 may be busy at one station, e.g., at station 30-i, only while a packet is electrically being received at, or transmitted from, the station; otherwise path 10 is not busy, or is idle, at least as to station 30-i. Thus, path 10 can be busy as to one station and not busy (or idle) as to another. Also, the time interval for a signal to propagation from one point on a path to another point on the path is commonly called the propagation delay between the two points.

As a further aside, it is common in the art that, when the stations are electrically relatively close to each other, e.g., within about two miles or about 2.5 kilometers of each other, such an arrangement is referred to as, among other things, a local communications system or network or as a local digital network. Thus, in line with the structure illustrated in FIG. 1, a plurality of local networks may be interconnected for forming a still larger communications system.

Broadly, the instant invention contemplates transmitting and receiving signals among and between a plurality of local networks.

For example, in a first embodiment, signals transmitted and received on path 10 may comprise a plurality of predetermined frequency bands. Each frequency band may serve a respective local network. Accordingly, each such frequency band comprises a communications "channel". Thus path 10 may comprise a plurality of channels. Further, each channel may be a unidirectional channel or a bidirectional channel with respect to the transmitting and receiving of signals.

In a second embodiment, path 10 may comprise a plurality of "cables" and each cable may serve a respective local network. Of course, a combination of the first and second illustrative embodiments may give rise to a third illustrative embodiment.

For brevity and not by way of limitation, we assume one illustrative embodiment to describe the principles of our invention and refer casually to alternative embodiments to emphasize that the principles are not limited to the specific illustrative embodiment. Hence, each station 30-i may be connected to one or more local networks, each network operating, for example, in a predetermined frequency band. Also, assume bidirectional communication is permitted on path 10. For example, using two frequency bands, the bidirectional communication may be obtained by a first unidirectional transmission in a first frequency band and by a second unidirectional transmission in a second frequency band so that the first and second transmissions are oppositely directed. Thereby station 30-i can transmit to station 30-m where $i<m$ while station 30-j can also transmit to station 30-i.

Figure 2:
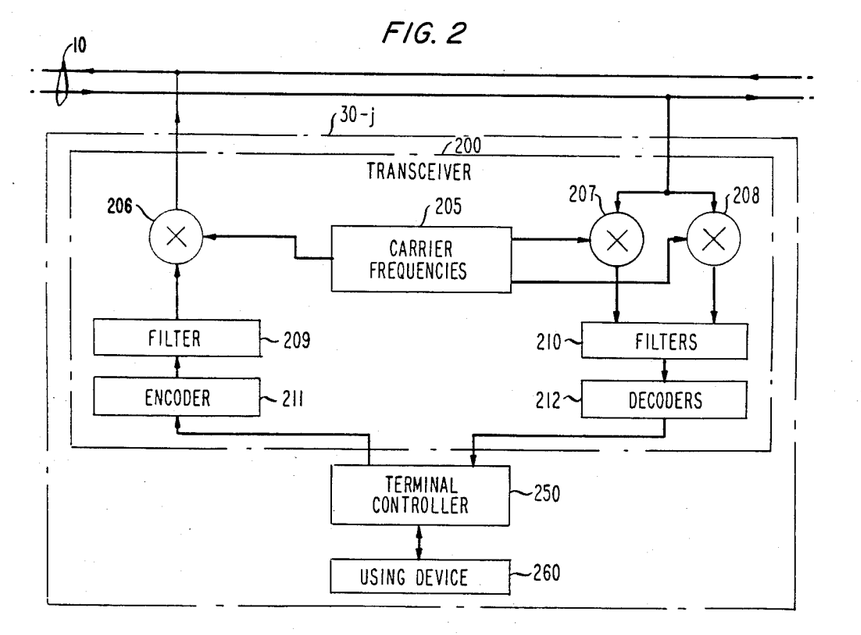
FIG. 2 illustrates one alternative station for use in the system of FIG. 1.

More particularly, the following description relates to the aforesaid first illustrative embodiment comprising a plurality of predetermined frequency bands. As illustrated in FIG. 2, station 30-i may comprise transceiver 20 (which parallels transceiver 100 of FIG. 1) for coupling signals to (and from) one or more networks on path 10 through terminal controller 250 (which parallels) interface stage 150) from (and to) using device 260 (which parallels using device 160). Transceiver 200 may include programmable carrier frequency arrangement 205 for providing one or more transmitter carrier frequencies as well as for providing one or more receiver carrier frequencies. The respective carrier frequencies may be extended through one or more modulators such as modulator 206 and/or through one or more demodulators such as demodulators 207 and 208. The received signal may be demodulated and extended through filters 210 and decoders 212 thence through interface stage 250 to using device 260. Conversely, the signals to be transmitted may be extended from using device 260 through interface stage 250, encoder(s) 211, and filter(s) 209 to be modulated by modulator(s) 206 with a transmitter carrier signal from arrangement 205 for transmission on path 10.

Figure 3:
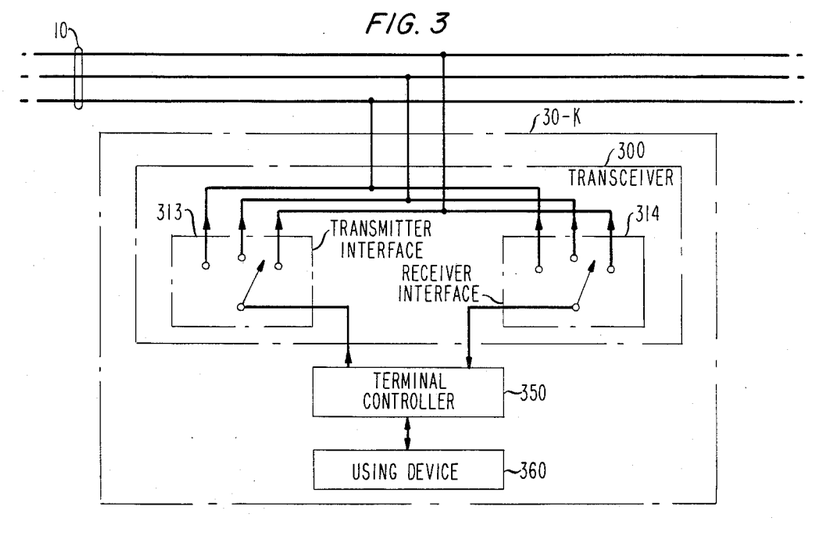
FIG. 3 illustrates another alternative station for use in the system of FIG. 1.

An alternative second illustrative embodiment comprising a plurality of "cables" is partially and briefly illustrated in FIG. 3. For succinctness, not all elements of transceiver 300 are illustrated in FIG. 3. The illustrative embodiment of FIG. 3 emphasizes a transmitter interface 313 which parallels the transmitter carrier frequencies provided by arrangement 205 of the first embodiment in FIG. 2. In similar fashion, transceiver interface 13 parallels the receiver carrier frequencies provided by arrangement 205. FIG. 3 emphasizes that a plurality of cables on path 10 may be an alternative embodiment to the plurality of frequencies on path 10 in FIG. 2.

PROPAGATION DELAY

The foregoing illustrative structure could embody therein one or more protocols (or methods, or processes) for accessing the one or more local data networks formed, for example, by the different frequency bands of FIG. 2 or by the different cables in FIG. 3. As priorly described, there typically exists a time interval for a packet to electrically propagate, or travel, from a transmitting station to a receiving station. It should be evident that the propagation time, also called propagation delay in the art, is typically a maximum as between the two electrically most distant stations. One way to decrease the propagation delay could include reducing the electrical distance between stations.

ACCESS DELAY

Various factors are known to cause a need for communications among and between stations. As the need for communications increases, it may become increasingly difficult for one station to gain access to a communications path because other stations coupled to the path may fail to release the path for the one station to gain access to the path. As a result of such factors, traffic patterns can evolve which may delay access to the path. We assume that such typically exogenous factors can result in the plurality of stations N being economically and efficiently assigned to predetermined respective ones of a plurality of local networks M, e.g., $n_m$ stations being assigned to the m-th local network so that $$N = \sum_{m=1}^{M} n_m.$$

In what follows, each station is assumed to be assigned to a "home-network" and may be assigned to one or more other networks. Also, an identification of the home-network of a station is assumed to be included as a part of the address of the station. Further, each station is assumed to maintain a list of the home-networks of all stations with which it may communicate and to be adapted to determine the home-network of each such station. The event that a calling station cannot determine the home-network of a called station is discussed hereinafter.

PACKET FORMAT

Figure 4:
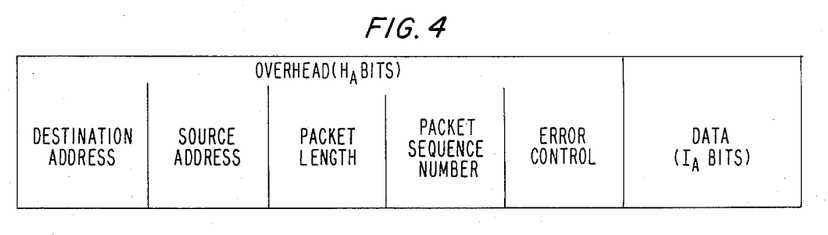
FIG. 4 illustrates a typical data packet format useful in describing the principles of the invention.

In preparation for describing more specifically the instant control protocol, FIG. 4 depicts the format of a well known, yet illustrative, packet for communicating digital information. A packet need not comprise a fixed number of bits but rather different packets could comprise different numbers of bits. For illustration, the packet is assumed to include a plurality of fields, each field including one or more bits. Here, a packet may comprise two fields. For example, the packet may comprise an overhead field of $H_A$ bits and a data field of $I_A$ bits. As is common in the art, the overhead field may, in turn, include a destination station address field for identifying a called station, a source station address field for identifying a calling station, a packet length field for identifying the number of information bits, a packet sequence number field for identifying where the packet fits in a message having a plurality of packets, an error control field for checking errors in the packet, and perhaps other field(s) for identifying other attribute(s). The data field is for inserting the "information" to be transmitted, here shown as including a variable number $I_A$ of bits.

INSTANT PROTOCOL

Referring to the illustrative station embodiment in FIG. 2, assume that each source station 30-j includes at least one source transmitter arrangement, e.g., the transmitter arrangement including modulator 206, for transmitting signals on a respective number of local data networks. For identification, call a source transmitter STR. Also assume that each source station 30-j includes at least two source receiver arrangements, e.g., the receiver arrangement including demodulators 207 and 208, for receiving signals from a respective number of local data networks. For identification, call one source receiver SREC1 and the other source receiver SREC2. Also, assume one receiver arrangement monitors, or couples signals from, the home-network of station 30-j while the other receiver arrangement(s) may monitor any of the M home-networks.

Figure 5:
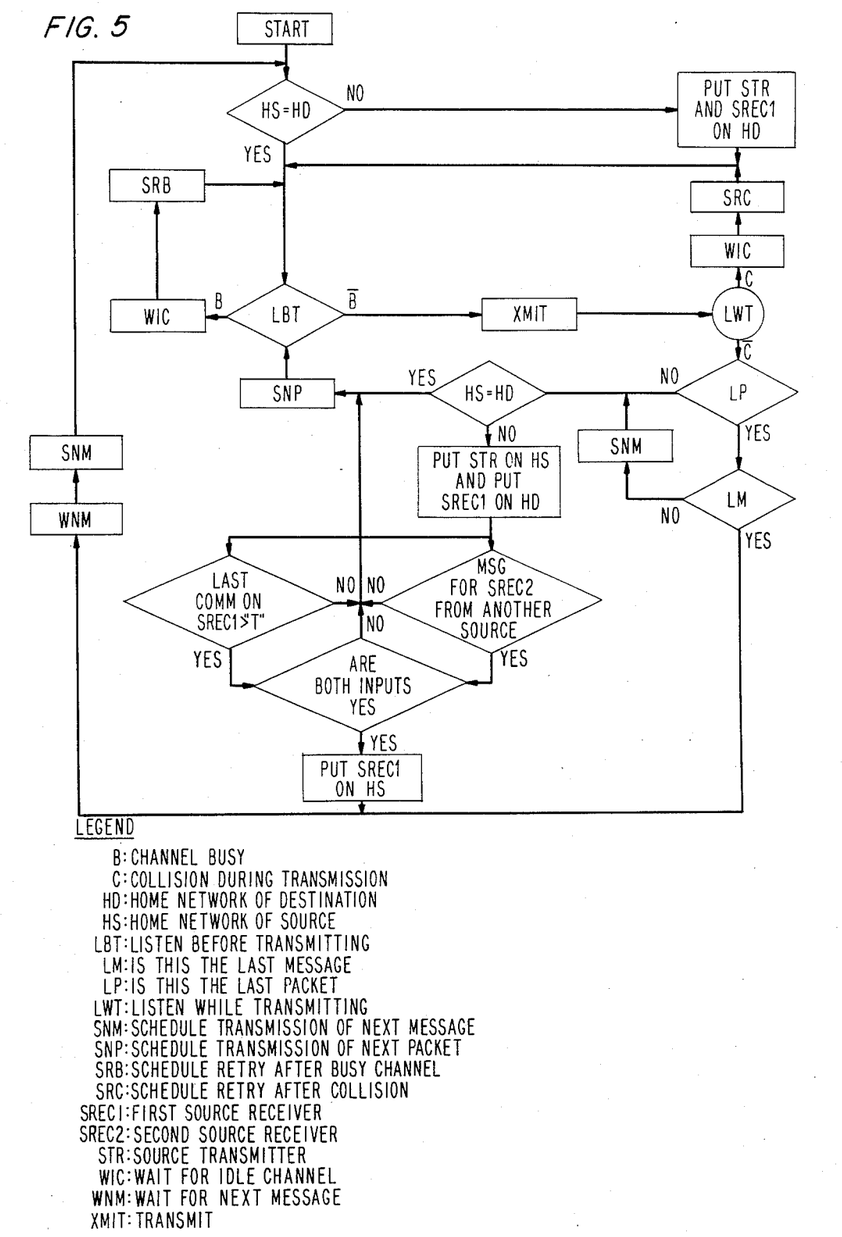
FIG. 5 includes a flow chart useful in describing the principles of the invention, which flow chart illustrates features of the instant invention, which features can readily be embodied in the system illustrated in FIG. 1 as well as in the stations illustrated in FIGS. 2 and 3.

Now turn to FIG. 5 which, in flow chart form, illustrates some features of the instant invention.

Before starting to transmit, a calling station (or source), which has a packet ready for transmission to a called station (or destination), determines the home network of the destination (HD). If the home network of the source (HS) and the home network of the destination (HD) are different home networks, the source, e.g., by way of programmable carrier frequency arrangement 205, couples its source transmitter (here, e.g., STR) and one of its source receivers (here, e.g., SREC1) to the home network of the destination. If the home network of the source and the home network of the destination are not different (i.e., whether by preassignment or by the aforedescribed STR/SREC1 coupling), the source listens to the channel before transmitting (LBT). If the channel (i.e., the home network of the destination is now the channel for transmission and receiving purposes, at least as to the first packet of a message which will be clarified hereinafter) is busy (B), the source refrains from transmitting, waits for an idle channel (WIC) and schedules a retry after detecting the channel to be busy (SRB). If the channel is not busy ($\overline{B}$), the source begins to transmit (XMIT).

The source listens to the channel while transmitting (LWT). If a collision (C) with another source is detected, the souce terminates transmitting, waits for an idle channel (WIC) and schedules a retry after detecting the collision (SRC). If no collision is detected ($\overline{C}$), the source continues to transmit.

If the channel is busy or if a collision is detected, the retry strategy may include scheduling a retransmission attempt some determinable time after terminating the transmission according to any of the standard (e.g., random) retry rules such as disclosed in the aforecited U.S. Pat. No. 4,063,220.

If there are no more packets to transmit, i.e., the last packet (LP) has been transmitted, and there are no more messages to be transmitted, i.e., the last message (LM) has been transmitted, the source waits for a next message (WNM) and, responsive thereto, schedules the next message (SNM) for starting a transmission.

If there are other packets to transmit, i.e., either the event that the last packet (LP) was not transmitted or the event that the last message (LM) was not transmitted, in which latter event a next message is scheduled (SNM), the source redetermines the home networks of both the source and the destination, i.e., does HS=HD?. If the home networks are not different, a next packet is scheduled (SNP) for transmission, i.e., the source repeats the aforedescribed processes beginning with the step of listening before transmitting (LBT). If the home network of the source and the home network of the destination are different, the source transmitter (STR) is returned to the home network of the source (HS) while the first source receiver (SREC1) remains coupled to the home network of the destination. Thereafter, the second and subsequent packets of a message are transmitted, not on the home network of the destination but rather, on the home network of the source, i.e., HS.

Nextly, (1) if there is a message for the source from some other source, which message would usually be received through the second source receiver SREC2, which second source receiver SREC2 is adapted to monitor the home network of the source, and (2) if the time interval between transmissions as detected by the first source receiver coupled to the HD, i.e., as detected by source receiver SREC1, exceeds some predetermined threshold T seconds, the first source receiver, which is coupled to the HD, i.e., source receiver SREC1, is decoupled therefrom and coupled to the HS; otherwise the station waits and schedules the transmission for a next packet (SNP). Subsequent to the decoupling/coupling, the station waits for a next message (WNM) and schedules the next message for transmission (SNM).

Thus in summary, the instant protocol includes the following steps:
  (i) Listen before transmitting (LBT)
      Before starting to transmit, listen to the channel. If the channel is busy, someone else is transmitting, accordingly, do not transmit. If the channel is not busy, also called "idle" herein, then transmit.
  (ii) Listen while transmitting (LWT)
      While transmitting, listen to signals on the channel. If the data become distorted, indicating that someone else is also transmitting, i.e., a collision, stop transmitting; otherwise, continue to transmit.
  (iii) Retry strategy
      If the channel is busy or if a collision is detected, wait for the channel to become idle, then schedule the next transmission attempt according to any of the standard (e.g., random) retry rules.
  (iv) After the first packet
      For a message having two or more packets, the first packet is transmitted on the home-network of the destination while the second and subsequent packets are transmitted on the home-network of the source.

Even more particularly and yet by way of summary, any source station 'A' desiring to transmit to any destination station 'B' goes through the following steps.
  (a) Determine the home-network of station B, say it is $Net_b$.
  (b) Listen to $Net_b$ before transmitting.
  (c) If $Net_b$ is idle (e.g., by detecting an absence of carrier), station A transmits to station B on $Net_b$.
  (d) If there is no collision, then after the finish of the packet, all stations on $Net_b$ remain silent for a predetermined time period, for example, for two predetermined propagation delay time intervals so that an acknowledgment may be sent from station B to station A without collision. Since station A has at least one receiver listening to $Net_b$, after station B receives the packet, station B may send, i.e., transmit, an acknowledgment to station A on $Net_b$.
  (e) If more than one packet is to be transmitted, then, inasmuch as station A is listening to $Net_b$ (e.g., by way of SREC1) and inasmuch as station B is listening to $Net_a$, both stations may transmit on their respective source home-networks. Thus, if a message includes several packets, only the first packet may be transmitted on a home-network different than the source home-network. From the above example, it should be clear that the first packet from station A to station B was transmitted on $Net_b$. All of the subsequent packets in the message are transmitted on $Net_a$. Station B can receive these subsequent packets because it is listening to $Net_a$.
  (f) If at step (d), station B is already in communication with some other station on a different network, then station B would still have at least one receiver on $Net_b$. If the source transmitter of station B is also on $Net_b$ (as it normally is, except when it is trying to set up an initial first packet connection with a station on a network other than $Net_b$), and even if station B is transmitting to some other station, station B can send an acknowledgment back to station A. If, however, the source transmitter of station B is transmitting on a different home-network, i.e., a network other than $Net_b$, there may be delay in transmitting the acknowledgment.
  (g) If, after successful connection, there is no transmission for a predetermined time interval and if the receiver on a home-network receives a message from another source, then the receivers of both stations go back to their respective home-networks.
  (h) If the source station cannot determine the home-network of the destination station, then the source station may send a message to a Resource Manager station which, in turn, may obtain the destination address and the home-network of the destination station. Having obtained such information, the communication may proceed as in the previous steps.
  (i) Many different broadcast modes are possible, a broadcast being the transmission of a message to more than one destination station. If the broadcast is intended only for stations on one particular home-network, then the packet(s) are transmitted on that one network only. However, if broadcast is intended for stations on other home-network(s), then the transmitter has to successfully transmit on each of the other network(s). There need not be an acknowledgment in the broadcast mode.

ALTERNATIVE PROTOCOL

Alternatives to the specific steps aforedescribed, which alternatives are consistent with the principles of the instant invention, may come to mind. For example, when there are large file transfers, there is typically a concomitant long time usage of the home-network by a source station. This event could prevent other stations on the same home-network from using the channel—this even though still other networks may be idle. The instant protocol also contemplates sharing the channels more evenly in the presence of large file transfers by one of the stations. According to this aspect of the protocol, the network on which a predetermined group of stations begins transmitting can be switched to another network according to a predetermined strategy, e.g., on a periodic basis. The period can be on the order of several packets long (or equivalently tens of milliseconds). The periodic switching can be embodied through a clock at every station, which clock may be provided, for example, on a different band of frequencies (or channel). Details of this alternative to the protocol include:

(1) Stations in a given geographical area can be grouped together and several such groups can be created. Of course, this grouping is made known to all the stations (each group is similar to a home-network). Thus, each station is preassigned to a group.

Figure 6:
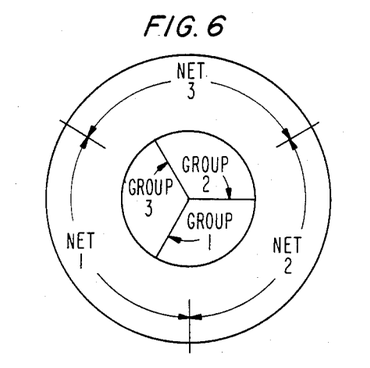
FIG. 6 illustrates a timing relationship for changing local networks according to a predetermined strategy and is useful in describing the principles of the invention.

(2) A group has both a home-network and an assigned transmission network. The home-network is fixed, whereas the transmission network can change, for example, according to the predetermined strategy. A station may, at any time, initiate a transmission only on the transmission network to which its group is then assigned. Inasmuch as the packet size need not be fixed, once initiated, the transmission may continue beyond a fixed time interval, at the expiration of which a change in the transmission network may occur according to the predetermined strategy. As an example, FIG. 6 shows the case of three groups (of home networks), three transmission networks and three sectors of time.

(3) A station has at least two receivers (e.g., SREC1 and SREC2). When the station is idle, both receivers listen to the source home-network. After establishing a connection, one receiver (e.g., SREC1), switches to the home-network of the destination station and the other receiver (e.g., SREC2) remains on the home-network of the source station.

(4) Station A desiring to transmit to station B goes through the following process:

(a) Determines the home-network of station B, say it is $Net_b$.

(b) Waits for the time interval during which station A is allowed to transmit on $Net_b$ (See FIG. 6).

(c) During that time interval, listens to $Net_b$ before transmitting.

(d) If $Net_b$ is idle (during the allowed time interval), station A transmits to station B of $Net_b$.

(e) If there is no collision, then after the finish of the packet, all stations of $Net_b$ remain silent for a predetermined time period equivalent to, for example, two propagation delays, so that an acknowledgment may be sent from station B to station A without collision. Since station A has at least one receiver listening on $Net_b$, station B may send the acknowledgment to station A on $Net_b$.

(f) If more than one packet is to be transmitted, then station B switches one of its receivers to the transmission network on which station A will transmit (this transmission network will change according to the predetermined strategy). Station A switches one of its receivers to the transmission network on which station B will transmit. As mentioned, the networks, on which the stations may transmit, will change according to the predetermined strategy.

(g) If, at step (f), station B is already in communication, then its acknowledgment to station A (in step (e)) will so indicate.

(h) If, after a successful connection, there is no transmission for a predetermined time interval, receivers of both stations go back to their respective home-networks.

(i) If station A cannot determine the home-network of station B, then a procedure similar to that priorly described may be adopted.

Although the invention has been described and illustrated in detail, it is to be understood that the same is not by way of limitation. For example, some alternative embodiments have been described. Other alternatives will be clear to the skilled artworker. Hence, the spirit and scope of the invention is limited only by the terms of the appended claims.

What is claimed is:

1. A method for controlling digital signals in a communication system that includes a plurality of home networks, each home network coupling a set of stations assigned thereto, a plurality of said stations having a transmitter, at least a first receiver and a second receiver, a communication path for connecting station second receivers to home networks other than assigned home networks including a plurality of channels each for connecting station second receivers of any of said home networks designated as a source home network to any other of said home networks designated as a destination home network, each of said plurality of stations including means for coupling signals to its assigned home network through its transmitter, means for receiving signals from its assigned home network through its first receiver and means for receiving signals from other home networks through its second receiver and one of said second receiver to home network channels on said communication path, said method comprising the steps of:

at a source station coupled to a source home network having its second receiver connectable to a plurality of receiver to home network connecting channels on said communication path, determining the home network of a destination station having at least one receiver to home network connecting channel on said path, and connecting the second receiver of said source station to said destination home network through one of the receiver to home network connecting channels whereby a station is capable of transmitting on its assigned home network and receiving on another home network.

2. The method defined in claim 1 further comprising the steps of:

coupling a source transmitter to said home network of said destination.

3. The method defined in claim 2 further comprising the steps of:

detecting the busy/idle status of said destination home network through said receiver to home network connecting channel and said second receiver;

responsive to said destination home network being detected as busy, waiting for an idle channel.

4. The method defined in claim 2 further comprising the steps of:

detecting the busy/idle status of said destination home network through said receiver to home network connecting channel and said second receiver;

responsive to said destination home network being detected as idle, acquiring access to an idle receiver to home network connecting channel, responsive to acquiring access to said idle receiver to home network connecting channel, transmitting a first packet from said source to said destination on said idle channel, said idle communication path channel thereby becoming a busy receiver to home network connecting channel.

5. The method defined in claim 4 further comprising the steps of:

listening to said destination home network during the transmitting of said first packet from said source to said destination through said receiver to home network connecting channel and said second receiver;

responsive to said listening and upon detecting a collision, terminating said transmission and responsive to said terminating, waiting for said busy channel to become idle before attempting the re-transmitting of said first packet.

6. The method in claim 5 further comprising the step of:

at said source, scheduling a retry transmission from said source to said destination, said retry transmission to be attempted a determinable time after terminating said transmission in response to detecting said collision.

7. The method defined in claims 4, 5 or 6 further comprising the steps of;

at said source station, responsive to detecting the absence of a collision during the transmitting of said first packet and responsive to said source having at least one more packet to transmit whether to said destination or to another destination, determining the home network of the destination to which said at least one or more packet is to be transmitted, and coupling said source transmitter to the home network of said source station, and coupling said second source receiver to the home network of said destination to which said at least one more packet is to be transmitted.

8. The method defined in claim 7 further comprising the steps of:

at said source, jointly responsive to detecting a message from another source intended for a another source receiver of said source station and detecting the absence of a communication intended for the said second source receiver, coupling said second source receiver to said source home network.

9. The method defined in claim 8 further comprising the steps of:

at said source, responsive to detecting the absence of a message from another source intended for said another source receiver or detecting a communication intended for the said second source receiver, scheduling a next packet for transmission from said source to said destination.

10. The method defined in claim 4, 5, or 6 further comprising the steps of:

assigning a plurality of stations including said source station to a group;

assigning said group to said source home network;

assigning said group to a first transmission network, said transmission network including a channel for transmitting signals from said source station; and changing the group assignment to said first transmission network to an assignment to a second transmission network according to a predetermined strategy.

11. A communication system including:

a plurality of; home networks, each home network coupling a set of stations assigned thereto, a plurality of said stations having a transmitter and at least first and second receivers, a communication path for connecting station second receivers to home networks other than assigned home networks including a plurality of channels each for connecting station second receivers of any of said home networks designated as a source home network to any other of said home networks designated as a destination home network;

each of said plurality of stations comprising means for coupling signals to its assigned home network through its transmitter, means for receiving signals from its assigned home network through its first receiver and means for receiving signals from other home networks through its second receiver and one of said second receiver to home network channels on said communication path;

at least one of said plurality of stations associated with each home network having its second receiver adapted to be coupled to a plurality of receiver to home network connecting channels of said communication path;

means at a source station coupled to a source home network having a plurality of receiver to home network connecting channels on said communication path for determining the home network of a destination station having at least one receiver to home network connecting channel on said path; and means for coupling the second receiver of said source station to said destination home network through one of the receiver to home network connecting channels whereby said source station is capable of transmitting on its assigned home network and receiving on another home network.

12. The system defined in claim 11 wherein said source station further comprises:

means for coupling a source transmitter to said destination home network through one of said plurality of receiver to home network connecting channels.

13. The system defined in claim 12 wherein said source comprises means for detecting the busy/idle status of said destination home network through said receiver to home network connecting channel and said second receiver;

responsive to said destination home network being detected as busy, means for waiting for an idle receiver to home network connecting channel.

14. The system defined in claim 12 wherein said source comprises means for detecting the busy/idle status of said destination home network through said receiver to home network connecting channel and said second receiver;

responsive to said destination home network being detected as idle, means for acquiring access to an idle reciever to home network connecting channel, and responsive to acquiring said receiver to home network connecting channel, means for transmitting a first packet from said source to said destination.

15. The system defined in claim 14 wherein said source further comprises:
   means for listening to said destination home network during the transmitting of said first packet from said source to said destination through said home network receiver to connecting channel and said second receiver;
   means responsive to detecting a collision during said listening for terminating said transmission; and
   means responsive to said terminating for waiting for said channel to again become idle before attempting to retransmit said first packet.

16. The system defined in claim 15 wherein said source further comprises
   means for scheduling a retry transmission from said source to said destination, said retry transmission to be attempted a determinable time after terminating said transmission in response to detecting a collision.

17. The system defined in claim 14 wherein said source further comprises;
   means responsive to detecting the absence of a collision during the transmitting of said first packet and to said source having at least one more packet to transmit whether intended for said destination or intended for another destination for determining the home network of the intended destination; and
   means for coupling said source transmitter to the home network of said source station.

18. The system defined in claim 17 wherein said source further comprises:
   means for coupling said second source receiver to the home network of said intended destination through a receiver to home network connecting channel.

19. The system defined in claim 18 wherein said source further comprises:
   means responsive to detecting a message from another source intended for a another source receiver and to detecting the absence of a communication intended for said second source receiver for coupling said second source receiver to said source home network.

20. The system defined in claim 19 wherein said source further comprises:
   means responsive to detecting the absence of a message from another source intended for the source another station receiver or detecting a communication intended for said second source station receiver for scheduling a next packet for transmission from said source to said destination through a receiver to home network connecting channel.

21. The system defined in claim 11 further comprising:
   means for assigning a plurality of stations including said source to a group;
   means for assigning said group to said source home network;
   means for assigning said group to a first transmission network, said transmission network including a channel for transmitting signals from said source station; and
   means for changing the group assignment to said first transmission network to an assignment to a second transmission network according to a predetermined strategy.

22. A method for controlling digital signals in a communication system that includes a plurality of home networks, each home network coupling a set of stations assigned thereto, a plurality of said stations having a transmitter and at least first and second receivers,
   a communication path for connecting station second receivers to home networks other than assigned home networks including a plurality of channels each for connecting station second receivers of any of said home networks designated as a source home network to any other of said home networks designated as a destination home network,
   each of said plurality of said stations including means for controlling signals to its assigned home network through its transmitter, means for receiving signals from its assigned home network through its first receiver and means for receiving signals from other home networks through its second receiver and one of said second receiver to home network channels on said communication path,
   said method comprising the steps of:
   at a source station coupled to a source home network having at least one second receiver to home network connecting channel on said communication path, determining the home network of a destination station having a plurality of receiver to home network connecting channels on said path, and
   coupling the second receiver of said source station to said destination home network through one of the receiver to home network connecting channels whereby a station is capable of transmitting on its assigned home network and receiving on another home network.

* * * * *